United States Patent
Mukherjee et al.

(10) Patent No.: US 6,961,781 B1
(45) Date of Patent: Nov. 1, 2005

(54) PRIORITY RULES FOR REDUCING NETWORK MESSAGE ROUTING LATENCY

(75) Inventors: Shubhendu S. Mukherjee, Framingham, MA (US); Richard E. Kessler, Shrewsbury, MA (US); Steve Lang, Stow, MA (US); David A. J. Webb, Jr., Groton, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 770 days.

(21) Appl. No.: 09/652,322

(22) Filed: Aug. 31, 2000

(51) Int. Cl.[7] .................. G06F 15/173; G06F 15/16

(52) U.S. Cl. .................. 709/240; 709/232; 709/238

(58) Field of Search .................. 709/103, 230, 709/238, 240, 232; 710/5, 241; 370/392, 400, 412

(56) References Cited

U.S. PATENT DOCUMENTS

| | | | | |
|---|---|---|---|---|
| 5,151,900 A | * | 9/1992 | Snyder et al. | 370/400 |
| 5,261,066 A | | 11/1993 | Jouppi et al. | 395/425 |
| 5,317,718 A | | 5/1994 | Jouppi | 395/425 |

(Continued)

OTHER PUBLICATIONS

*Alpha Architecture Reference Manual*, Third Edition, The Alpha Architecture Committee, 1998 Digital Equipment Corporation (21 p.), in particular pp. 3–1 through 3–15.

*A Logic Design Structure For LSI Testability*, E. B. Eichelberger et al., 1977 IEEE (pp. 462–468).

*Direct RDRAM™256/288–Mbit (512K×16/18×32s)*, Preliminary Information Document DL0060 Version 1.01 (69 p.).

*Testability Features of AMD–K6™Microprocessor*, R. S. Fetherston et al., Advanced Micro Devices (8 p.).

*Hardware Fault Containment in Scalable Shared–Memory Multiprocessors*, D. Teodosiu et al., Computer Systems Laboratory, Stanford Universty (12 p.), 1977.

(Continued)

*Primary Examiner*—Rupal Dharia
*Assistant Examiner*—Quang N. Nguyen

(57) ABSTRACT

A system and method is disclosed for reducing network message passing latency in a distributed multiprocessing computer system that contains a plurality of microprocessors in a computer network, each microprocessor including router logic to route message packets prioritized in importance by the type of message packet, age of the message packet, and the source of the message packet. The microprocessors each include a plurality of network input ports connected to corresponding local arbiters in the router. The local arbiters are each able to select a message packet from the message packets waiting at the associated network input port. Microprocessor input ports and microprocessor output ports in the microprocessor allow the exchange of message packets between hardware functional units in the microprocessor and between the microprocessors. The microprocessor input ports are similarly each coupled to corresponding local arbiters in the router. Each of the local arbiters is able to select a message packet among the message packets waiting at the microprocessor input port. Global arbiters in the router connected to the network output ports and microprocessor output ports select a message packet from message packets nominated by the local arbiters of the network input ports and microprocessor input ports. The local arbiters connected to each network input port or microprocessor input port will request service from a output port global arbiter for a message packet based on the message packet type if the message packet is ready to be dispatched.

47 Claims, 7 Drawing Sheets

U.S. PATENT DOCUMENTS

| | | | |
|---|---|---|---|
| 5,752,076 A * | 5/1998 | Munson | 710/5 |
| 5,758,183 A | 5/1998 | Scales | 395/825 |
| 5,761,729 A | 6/1998 | Scales | 711/148 |
| 5,787,480 A | 7/1998 | Scales et al. | 711/148 |
| 5,802,585 A | 9/1998 | Scales et al. | 711/154 |
| 5,809,450 A | 9/1998 | Chrysos et al. | 702/186 |
| 5,875,151 A | 2/1999 | Mick | 365/233 |
| 5,890,201 A | 3/1999 | McLellan et al. | 711/108 |
| 5,892,766 A * | 4/1999 | Wicki et al. | 370/412 |
| 5,893,931 A | 4/1999 | Peng et al. | 711/206 |
| 5,918,250 A | 6/1999 | Hammond | 711/205 |
| 5,918,251 A | 6/1999 | Yamada et al. | 711/207 |
| 5,923,872 A | 7/1999 | Chrysos et al. | 395/591 |
| 5,950,228 A | 9/1999 | Scales et al. | 711/148 |
| 5,964,867 A | 10/1999 | Anderson et al. | 712/219 |
| 5,970,232 A * | 10/1999 | Passint et al. | 709/238 |
| 5,983,325 A | 11/1999 | Lewchuk | 711/137 |
| 5,987,518 A * | 11/1999 | Gotwald | 709/230 |
| 6,000,044 A | 12/1999 | Chrysos et al. | 714/47 |
| 6,070,227 A | 5/2000 | Rokicki | 711/117 |
| 6,073,199 A * | 6/2000 | Cohen et al. | 710/241 |
| 6,085,300 A | 7/2000 | Sunaga et al. | 711/168 |
| 6,282,195 B1 * | 8/2001 | Miller et al. | 370/392 |
| 6,286,083 B1 * | 9/2001 | Chin et al. | 710/241 |
| 6,449,251 B1 * | 9/2002 | Awadallah et al. | 709/103 |

OTHER PUBLICATIONS

*Cellular Disco: resource management using virtal clusters on shared–memory multiprocessors*, K. Govil et al., 1999 ACM 1–58113–140–2/99/0012 (16 p.).

*Are Your PLDs Metastable?*, Cypress Semiconductor Corporation, Mar. 6, 1997 (19 p.).

*Rambus® RIMM™Module (with 128/144Mb RDRAMs)*, Preliminary Information, Document DL0084 Version 1.1 (12 p.).

*Direct Rambus™RIMM™Module Specification Version 1.0*, Rambus Inc., SL–0006–100 (32 p.), 2000.

*End–To–End Fault Containment In Scalable Shared–Memory Multiprocessors*, D. Teodosiu, Jul. 2000 (148 p.).

* cited by examiner

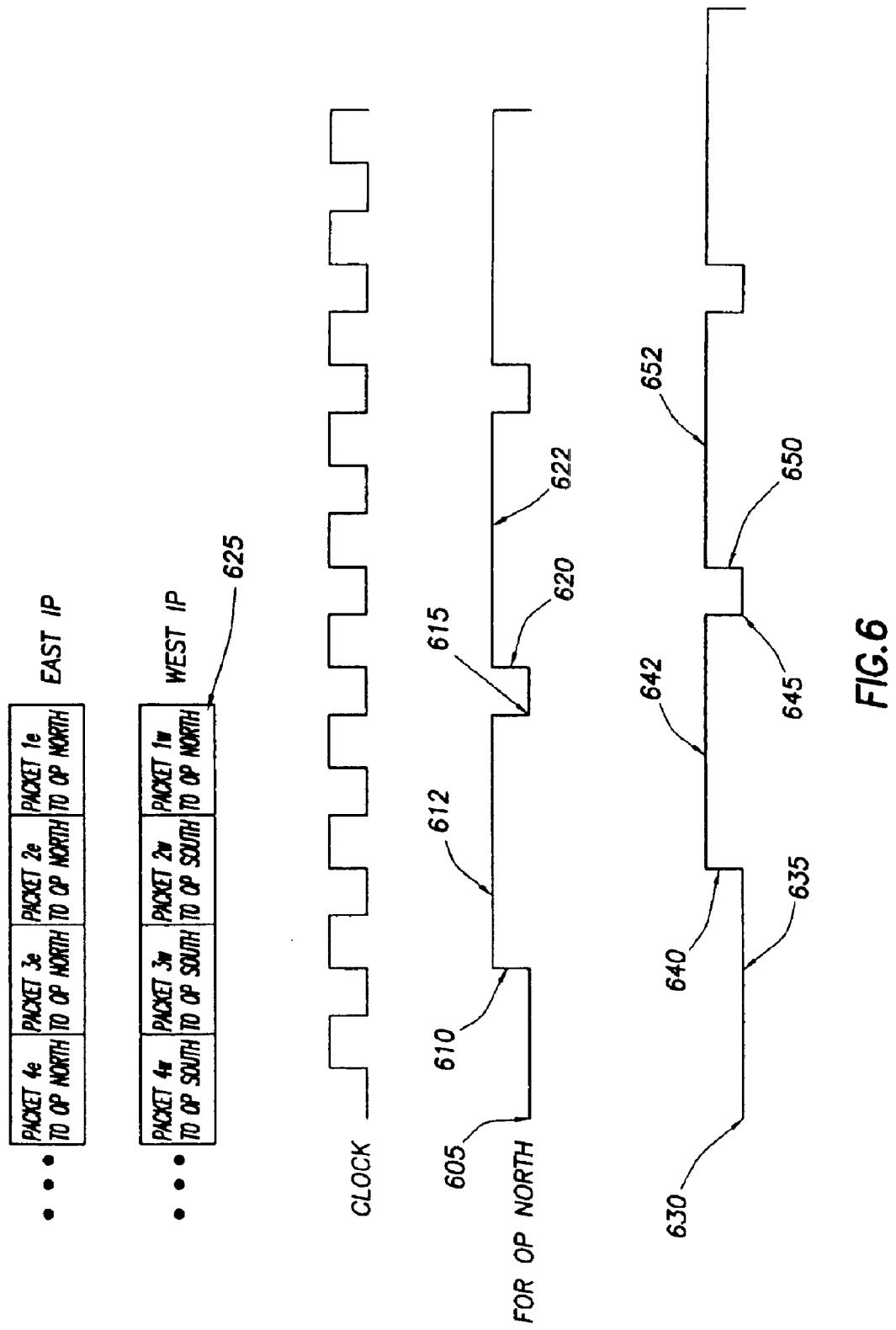

PRIORITY RULES FOR REDUCING NETWORK MESSAGE ROUTING LATENCY

CROSS-REFERENCE TO RELATED APPLICATIONS

This application relates to the following commonly assigned co-pending applications entitled:

"Apparatus And Method For Interfacing A High Speed Scan-Path With Slow-Speed Test Equipment," Ser. No. 09/653,642, filed Aug. 31, 2000; "Scalable Directory Based Cache Coherence Protocol," Ser. No. 09/652,703, filed Aug. 31, 2000; "Scalable Efficient I/O Port Protocol," Ser. No. 09/652,391, filed Aug. 31, 2000; "Efficient Translation Lookaside Buffer Miss Processing In Computer Systems With A Large Range Of Page Sizes," Ser. No. 09/652,552, filed Aug. 31, 2000; "Fault Containment And Error Recovery Techniques In A Scalable Multiprocessor," Ser. No. 09/651,949, filed Aug. 31, 2000; "Speculative Directory Writes In A Directory Based Cache Coherent Nonuniform Memory Access Protocol," Ser. No. 09/652,834, filed Aug. 31, 2000; "Special Encoding Of Known Bad Data," Ser. No. 09/652,314, filed Aug. 31, 2000; "Broadcast Invalidate Scheme," Ser. No. 09/652,165, filed Aug. 31, 2000; "Mechanism To Track All Open Pages In A DRAM Memory System," Ser. No. 09/652,704, filed Aug. 31, 2000; "Programmable DRAM Address Mapping Mechanism," Ser. No. 09/653,093, filed Aug. 31, 2000; "Computer Architecture And System For Efficient Management Of Bi-Directional Bus," Ser. No. 09/652,323, filed Aug. 31, 2000; "An Efficient Address Interleaving With Simultaneous Multiple Locality Options," Ser. No. 09/652,452, filed Aug. 31, 2000; "A High Performance Way Allocation Strategy For A Multi-Way Associative Cache System," Ser. No. 09/653,092, filed Aug. 31, 2000; "Method And System For Absorbing Defects In High Performance Microprocessor With A Large N-Way Set Associative Cache," Ser. No. 09/651,948, filed Aug. 31, 2000; "A Method For Reducing Directory Writes And Latency In A High Performance, Directory-Based, Coherency Protocol," Ser. No. 09/652,324, filed Aug. 31, 2000; "Mechanism To Reorder Memory Read And Write Transactions For Reduced Latency And Increased Bandwidth," Ser. No. 09/653,094, filed Aug. 31, 2000; "System For Minimizing Memory Bank Conflicts In A Computer System," Ser. No. 09/652,325, filed Aug. 31, 2000; "Computer Resource Management And Allocation System," Ser. No. 09/651,945, filed Aug. 31, 2000; "Input Data Recovery Scheme," Ser. No. 09/653,643, filed Aug. 31, 2000; "Fast Lane Prefetching," Ser. No. 09/652,451, filed Aug. 31, 2000; "Mechanism For Synchronizing Multiple Skewed Source-Synchronous Data Channels With Automatic Initialization Feature," Ser. No. 09/652,480, filed Aug. 31, 2000; "Mechanism To Control The Allocation Of An N-Source Shared Buffer," Ser. No. 09/651,924, filed Aug. 31, 2000; and "Chaining Directory Reads and Writes To Reduce DRAM Bandwidth In A Directory Based CC-NUMA Protocol," Ser. No. 09/652,315, filed Aug. 31, 2000, all of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to a multiprocessing computer system that uses superscalar microprocessors in a networked environment for message passing. More particularly, the invention relates to a distributed shared memory multiprocessing computer system that incorporates message passing priority rules to reduce network message routing latency.

2. Background of the Invention

Distributed computer systems typically comprise multiple computers connected to each other by a communications network. In some distributed computer systems, networked computers can access shared data. Such systems are sometimes known as parallel computers. If a large number of computers are networked, the distributed system is considered to be "massively" parallel. One advantage of a massively parallel computer is that it can solve complex computational problems in a reasonable amount of time.

In such systems, the memories of the computers are collectively known as a Distributed Shared Memory ("DSM"). It is a problem to ensure that the data stored in the DSM is accessed in a coherent manner. Coherency, in part, means that only one microprocessor can modify any part of the data at any one time, otherwise the state of the system would be nondeterministic.

Recently, DSM systems have been built as a cluster of Symmetric Multiprocessors ("SMP"). In SMP systems, shared memory can be implemented efficiently in hardware since the microprocessors are symmetric (e.g., identical in construction, in operation) and operate on a single, shared microprocessor bus. Symmetric Multiprocessor systems have good price/performance ratios with four or eight microprocessors. However, because of the specially designed bus that makes message passing between the microprocessors a bottleneck, it is difficult to scale the size of an SMP system beyond twelve or sixteen microprocessors.

It is desired to construct large scale DSM systems using microprocessors connected by a network. The goal is to allow microprocessors to efficiently share the memories so that data fetched by one program executed on a first microprocessor from memory attached to a second microprocessor is immediately available to all microprocessors.

DSM systems function by using message passing to maintain the coherency of the shared memory distributed throughout the multiprocessing computer system. A message is composed of packets that contain identification information and data. Control of message routing is distributed throughout the system so that each message traveling through the multiprocessing computer system is locally controlled by the particular microprocessor visited. Message passing can reduce system performance since delays in transmission of message packets can slow down program execution. Delays in transmission can occur because of high latency due to congestion in the network (i.e., many messages trying to go through the limited physical connections of the networks). This type of congestion can cause tremendous performance degradation that can result in high overall program execution times.

Prior art methods and systems to solve the problem of high network message routing latency typically involve implementing complex hardware solutions resulting in small performance improvements. These systems have resulted in message routing algorithms requiring a great amount of hardware, increasing cost without corresponding performance improvements to justify the cost. Prior art hardware solutions cause network oscillations in the DSM system since new packets injected into the network slow down old and long haul packets. Long haul packets are message packets that take more than a couple of hops to reach their destination, a hop being the passing of a message between two microprocessors. This builds up congestion in different parts of the network. As congestion clears up, various microprocessors in prior art DSM systems inject more packets into the network. This causes the congestion to build up again, thereby creating oscillatory behavior in the DSM system. Therefore, a new system and method to reduce network message routing latency and resulting network oscillations is needed that results in higher performance but reduced hardware costs and complexity.

BRIEF SUMMARY OF THE INVENTION

The problems noted above are solved in large part by a distributed shared memory multiprocessing computer system that includes a plurality of microprocessors, with each microprocessor including router logic to route message packets prioritized in importance by the type of message packet, age of the message packet, and the source of the message packet. The microprocessors are connected together by network input ports and network output ports to form a computer network. Each of the network input ports connect to corresponding local arbiters in the router than are able to select a message packet from the message packets waiting at the network input port. The router also contains a starvation timer to indicate when a message packet is starved and must be given priority over non-starved packets for dispatch. In addition to the network ports, the microprocessor also contains microprocessor input ports and microprocessor output ports. Microprocessor ports allow microprocessor hardware functional units (other than the router) along with I/O devices connected to the microprocessor to connect to other microprocessors in the network through the network ports. The microprocessor input ports are each coupled to corresponding local arbiters in the router. Each of the local arbiters is able to select a message packet among the message packets waiting at the microprocessor input port. Global arbiters in the router connected to the network output ports and microprocessor output ports select a message packet from message packets nominated by the local arbiters of the network input ports and microprocessor input ports.

The local arbiters connected to each network input port or microprocessor input port will request service from an output port global arbiter for a message packet based on the type of message packet if the message packet is ready to be dispatched. The priority of message packet types in an input port buffer from highest priority to lowest priority is preferably: Block Response packet type, Acknowledgment packet type, Invalidation Broadcast packet type, Forward packet type, Request packet type, Write I/O packet type, and Read I/O packet type.

The global arbiter at an output port selects and transmits through the output port a message packet nominated by the local arbiter of an input port if the output port is idle. The global arbiter selects the input port based on the priority of the input port relative to other input ports. Network input ports north input port, south input port, west input port, and east input port have higher priority than microprocessor input ports Cbox input port, Zbox0 input port, Zbox1 input port, and I/O input port. If multiple network input ports are requesting the same output port or multiple microprocessor input ports are requesting the same output port, a Least-Recently-Granted priority algorithm selects the input port from the network input ports or microprocessor input ports to gain access to the output port.

BRIEF DESCRIPTION OF THE DRAWINGS

For a detailed description of the preferred embodiments of the invention, reference will now be made to the accompanying drawings in which:

FIG. 6 shows one example of starvation for a message packet in a microprocessor of the multiprocessing computer system caused by the arbitration mechanisms implemented for local and global arbitration and one solution.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
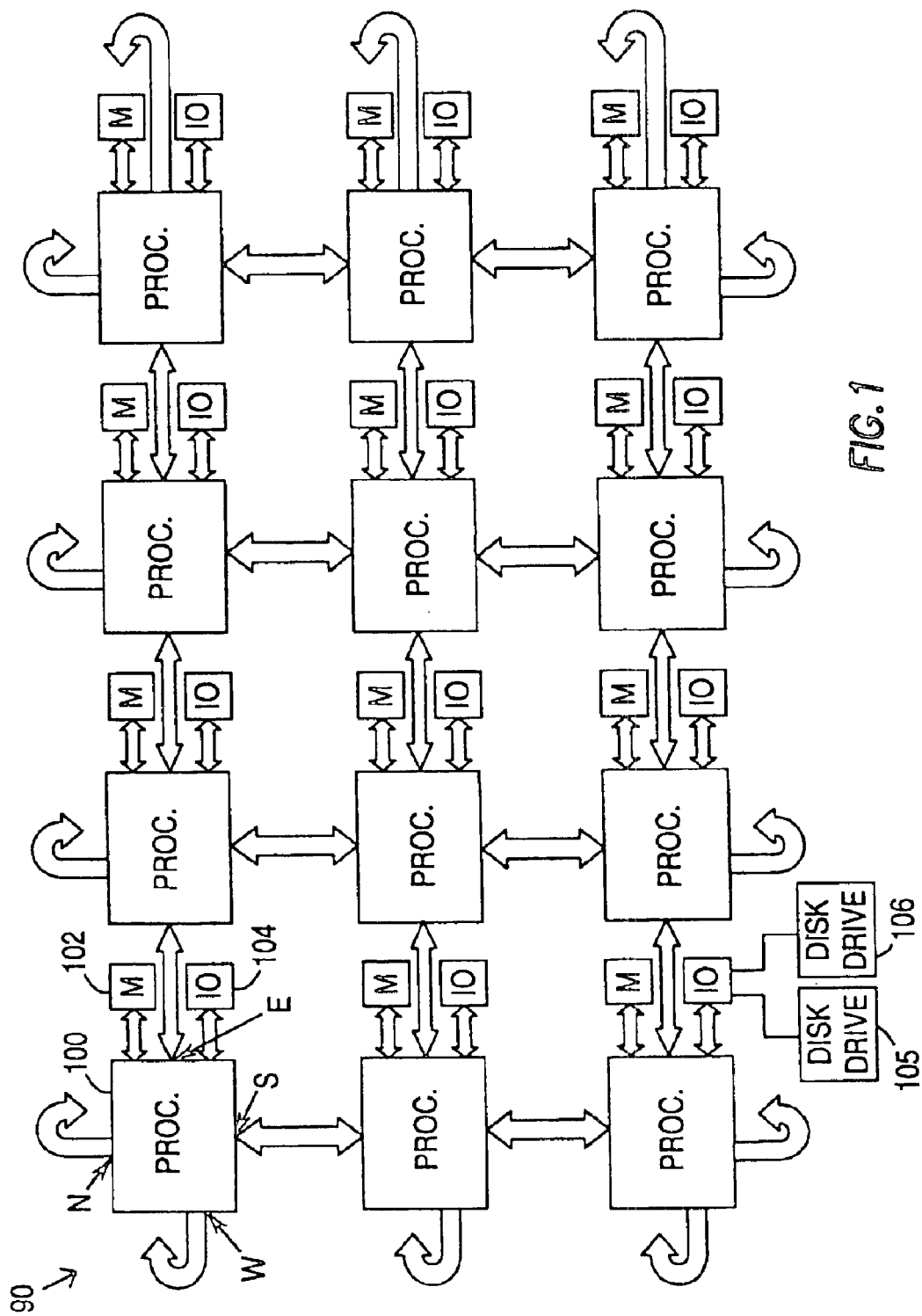
FIG. 1 shows a system diagram of a plurality of microprocessors coupled together.

Referring now to FIG. 1, in accordance with the preferred embodiment of the invention, computer system 90 comprises one or more microprocessors 100 coupled to a memory 102 and an input/output ("I/O") controller 104. As shown, computer system 90 includes 12 microprocessors 100, each microprocessor coupled to a memory and an I/O controller. Each microprocessor preferably includes four ports for connection to adjacent microprocessors. The interprocessor ports are designated "North," "South," "East," and "West" in accordance with the well-known Manhattan grid architecture. As such, each microprocessor 100 can be connected to four other microprocessors. The microprocessors on both end of the system layout wrap around and connect to microprocessors on the opposite side to implement a 2D torus-type connection. Although 12 microprocessors 100 are shown in the exemplary embodiment of FIG. 1, any desired number of microprocessors (e.g., 256) can be included.

The I/O controller 104 provides an interface to various input/output devices such as disk drives 105 and 106 as shown. Data from the I/O devices thus enters the 2D torus via the I/O controllers.

In accordance with the preferred embodiment, the memory 102 preferably comprises RAMbus™ memory devices, but other types of memory devices can be used if desired. The capacity of the memory devices 102 can be any suitable size. Further, memory devices 102 preferably are coupled to the microprocessor through a Rambus Interface Memory Modules ("RIMMs").

In general, computer system 90 can be configured so that any microprocessor 100 can access its own memory 102 and I/O devices, as well as the memory and I/O devices of all other microprocessors in the network. Preferably, the computer system may have dedicated physical connections between each microprocessor resulting in low interprocessor communication times and improved memory and I/O device access reliability. If dedicated physical connections are not present between each pair of microprocessors, a pass-through or bypass path is preferably implemented in each microprocessor that permits accesses to a microprocessor's memory and I/O devices by another microprocessor through one or more pass-through microprocessors.

Figure 2A:
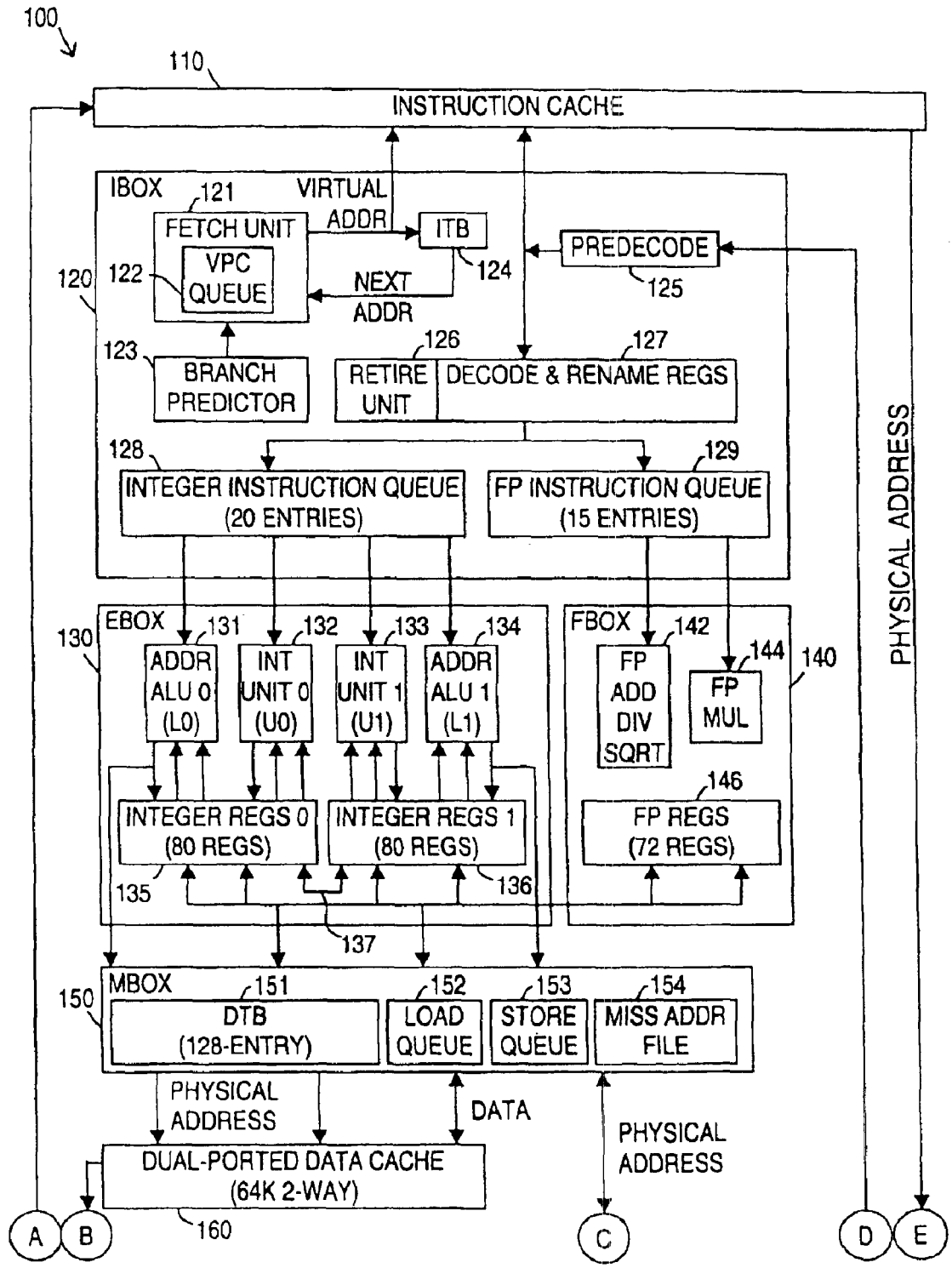
FIGS. 2a and 2b show a block diagram of the microprocessors of FIG. 1.
Figure 2B:
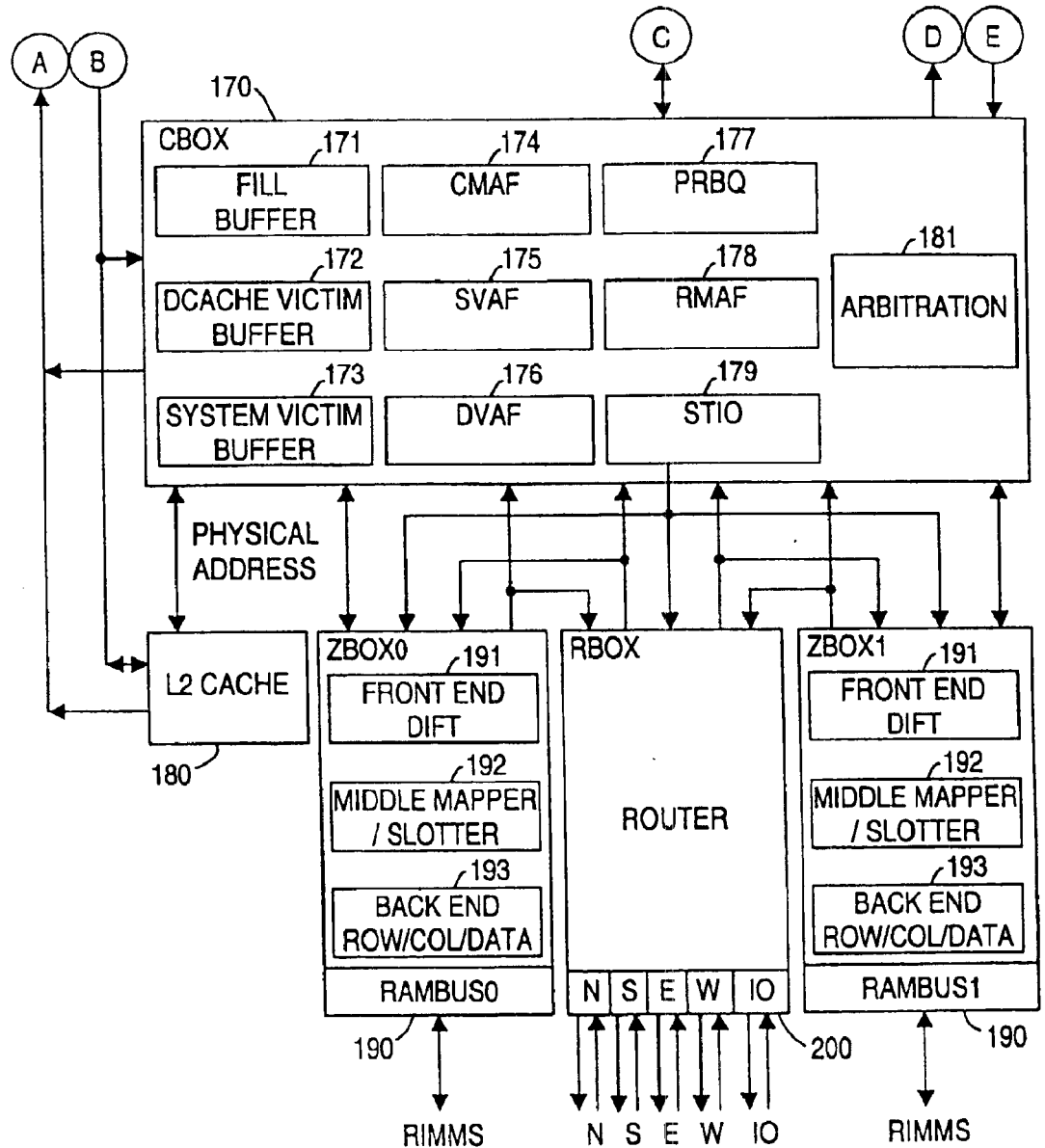

Referring now to FIGS. 2a and 2b, each microprocessor 100 preferably includes an instruction cache 110, an instruction fetch, issue and retire unit ("Ibox") 120, an integer execution unit ("Ebox") 130, a floating-point execution unit ("Fbox") 140, a memory reference unit ("Mbox") 150, a data cache 160, an L2 instruction and data cache control unit ("Cbox") 170, a level L2 cache 180, two memory controllers ("Zbox0" and "Zbox1") 190, and an interprocessor and I/O router unit ("Rbox") 200. The following discussion describes each of these units.

Each of the various functional units 110–200 contains control logic that communicate with various other control logic as shown in FIGS. 2a and 2b. The instruction cache control logic 110 communicates with the Ibox 120, Cbox 170, and L2 Cache 180. In addition to communicating with the instruction cache 110, the Ibox control logic 120 communicates with Ebox 130, Fbox 140 and Cbox 170. The Ebox 130 and Fbox 140 control logic both communicate with the Mbox 150, which in turn communicates with the data cache 160 and Cbox 170. The Cbox control logic also communicates with the L2 cache 180, Zboxes 190, and Rbox 200.

Referring still to FIGS. 2a and 2b, the Ibox 120 preferably includes a fetch unit 121 which contains a virtual program counter ("VPC") 122, a branch predictor 123, an instruction-stream translation buffer ("ITB") 124, an instruction predecoder 125, a retire unit 126, decode and rename registers 127, an integer instruction queue 128, and a floating point instruction queue 129. Generally, the VPC 122 maintains virtual addresses for instructions that are in flight. An instruction is said to be "in-flight" from the time it is fetched until it retires or aborts. The Ibox 120 can accommodate as many as 80 instructions, in 20 successive fetch slots, in flight between the decode and rename registers 127 and the end of the pipeline. The VPC preferably includes a 20-entry table to store these fetched VPC addresses.

The Ibox 120 uses the branch predictor 123 to handle branch instructions. A branch instruction requires program execution either to continue with the instruction immediately following the branch instruction if a certain condition is met, or branch to a different instruction if the particular condition is not met. Accordingly, the outcome of a branch instruction is not known until the instruction is executed. In a pipelined architecture, a branch instruction (or any instruction for that matter) may not be executed for at least several, and perhaps many, clock cycles after the fetch unit in the microprocessor fetches the branch instruction. In order to keep the pipeline full, which is desirable for efficient operation, the microprocessor preferably includes branch prediction logic that predicts the outcome of a branch instruction before it is actually executed (also referred to as "speculating"). The branch predictor 123, which receives addresses from the VPC queue 122, preferably bases its speculation on short and long-term history of prior instruction branches. As such, using branch prediction logic, a microprocessor's fetch unit can speculate the outcome of a branch instruction before it is actually executed. The speculation, however, may or may not turn out to be accurate. That is, the branch predictor logic may guess wrong regarding the direction of program execution following a branch instruction. If the speculation proves to have been accurate, which is determined when the microprocessor executes the branch instruction, then the next instructions to be executed have already been fetched and are working their way through the pipeline.

If, however, the branch speculation performed by the branch predictor 123 turns out to have been wrong (referred to as "misprediction" or "misspeculation"), many or all of the instructions behind the branch instruction may have to be flushed from the pipeline (i.e., not executed) because of the incorrect fork taken after the branch instruction. Branch predictor 123 uses any suitable branch prediction algorithm, however, that results in correct speculations more often than misspeculations, and the overall performance of the microprocessor is better (even in the face of some misspeculations) than if speculation was turned off.

The Instruction Translation Buffer ("ITB") 124 couples to the instruction cache 110 and the fetch unit 121. The ITB 124 comprises a 128-entry, fully-associative instruction-stream translation buffer than is used to store recently used instruction-stream address translations and page protection information. Preferably, each of the entries in the ITB 124 may be 1, 8, 64 or 512 contiguous 8-kilobyte (KB) pages or 1, 32, 512, 8192 contiguous 64-kilobyte pages. The allocation scheme used for the ITB 124 is a round-robin scheme, although other schemes can be used as desired.

The predecoder 125 reads an octaword (16 contiguous bytes) from the instruction cache 110. Each octaword read from instruction cache may contain up to four naturally aligned instructions per cycle. Branch prediction and line prediction bits accompany the four instructions fetched by the predecoder 125. The branch prediction scheme implemented in branch predictor 123 generally works most efficiently when only one branch instruction is contained among the four fetched instructions. The predecoder 125 predicts the instruction cache line that the branch predictor 123 will generate. The predecoder 125 generates fetch requests for additional instruction cache lines and stores the instruction stream data in the instruction cache.

Referring still to FIGS. 2a and 2b, the retire unit 126 fetches instructions in program order, executes them out of order, and then retires (also called "committing" an instruction) them in order. The Ibox 120 logic maintains the architectural state of the microprocessor by retiring an instruction only if all previous instructions have executed without generating exceptions or branch mispredictions. An exception is any event that causes suspension of normal instruction execution. Retiring an instruction commits the microprocessor to any changes that the instruction may have made to the software accessible registers and memory. The microprocessor 100 preferably includes the following three machine code accessible hardware units: integer and floating-point registers, memory, and internal microprocessor registers. The retire unit 126 of the preferred embodiment can retire instructions at a sustained rate of eight instructions per cycle, and can retire as many as 11 instructions in a single cycle.

The decode and rename registers 127 contains logic that forwards instructions to the integer and floating-point instruction queues 128, 129. The decode and rename registers 127 preferably perform the following two functions. First, the decode and rename registers 127 eliminates register write-after-read ("WAR") and write-after-write ("WAW") data dependency while preserving true read-after-write ("RAW") data dependencies. This permits instructions to by dynamically rescheduled. Second, the decode and rename registers 127 permits the microprocessor to speculatively execute instructions before the control flow previous to those instructions is resolved.

The logic in the decode and rename registers 127 preferably translates each instruction's operand register specifiers from the virtual register numbers in the instruction to the physical register numbers that hold the corresponding architecturally-correct values. The logic also renames each instruction destination register specifier from the virtual number in the instruction to a physical register number chosen from a list of free physical registers, and updates the register maps. The decode and rename register logic can process four instructions per cycle. Preferably, the logic in the decode and rename registers 127 does not return the physical register, which holds the old value of an instruction's virtual destination register, to the free list until the instruction has been retired, indicating that the control flow up to that instruction has been resolved.

If a branch misprediction or exception occurs, the register logic backs up the contents of the integer and floating-point rename registers to the state associated with the instruction that triggered the condition, and the fetch unit 121 restarts at the appropriate Virtual Program Counter ("VPC"). Preferably, as noted above, 20 valid fetch slots containing up to 80 instructions can be in flight between the registers 127 and the end of the microprocessor's pipeline, where control flow is finally resolved. The register 127 logic is capable of backing up the contents of the registers to the state associated with any of these 80 instructions in a single cycle. The register logic 127 preferably places instructions into the integer or floating-point issue queues 128, 129, from which they are later issued to functional units 130 or 136 for execution.

The integer instruction queue 128 preferably includes capacity for 20 integer instructions. The integer instruction queue 128 issues instructions at a maximum rate of four instructions per cycle. The specific types of instructions processed through queue 128 include: integer operate commands, integer conditional branches, unconditional branches (both displacement and memory formats), integer and floating-point load and store commands, Privileged Architecture Library ("PAL") reserved instructions, integer-to-floating-point and floating-point-integer conversion commands.

Referring still to FIGS. 2a and 2b, the integer execution unit ("Ebox") 130 includes Arithmetic Logic Units ("ALUs") 131, 132, 133, and 134 and two integer register files 135. Ebox 130 preferably comprises a 4-path integer execution unit that is implemented as two functional-unit "clusters" labeled 0 and 1. Each cluster contains a copy of an 80-entry, physical-register file and two subclusters, named upper ("U") and lower ("L"). As such, the subclusters 131–134 are labeled U0, L0, U1, and L1. Bus 137 provides cross-cluster communication for moving integer result values between the clusters.

The subclusters 131–134 include various components that are not specifically shown in FIG. 2a. For example, the subclusters preferably include four 64-bit adders that are used to calculate results for integer add instructions, logic units, barrel shifters and associated byte logic, conditional branch logic, a pipelined multiplier for integer multiply operations, and other components known to those of ordinary skill in the art.

Each entry in the integer instruction queue 128 preferably asserts four request signals—one for each of the Ebox 130 subclusters 131, 132, 133, and 134. A queue entry asserts a request when it contains an instruction that can be executed by the subcluster, if the instruction's operand register values are available within the subcluster. The integer instruction queue 128 includes two arbiters—one for the upper subclusters 132 and 133 and another arbiter for the lower subclusters 131 and 134. Each arbiter selects two of the possible 20 requesters for service each cycle. Preferably, the integer instruction queue 128 arbiters choose between simultaneous requesters of a subcluster based on the age of the request—older requests are given priority over newer requests. If a given instruction requests both lower subclusters, and no older instruction requests a lower subcluster, then the arbiter preferably assigns subcluster 131 to the instruction. If a given instruction requests both upper subclusters, and no older instruction requests an upper subcluster, then the arbiter preferably assigns subcluster 133 to the instruction.

The floating-point instruction queue 129 preferably comprises a 15-entry queue and issues the following types of instructions: floating-point operates, floating-point conditional branches, floating-point stores, and floating-point register to integer register transfers. Each queue entry preferably includes three request lines—one for the add pipeline, one for the multiply pipeline, and one for the two store pipelines. The floating-point instruction queue 129 includes three arbiters—one for each of the add, multiply, and store pipelines. The add and multiply arbiters select one requester per cycle, while the store pipeline arbiter selects two requesters per cycle, one for each store pipeline. As with the integer instruction queue 128 arbiters, the floating-point instruction queue arbiters select between simultaneous requesters of a pipeline based on the age of the request—older request are given priority. Preferably, floating-point store instructions and floating-point register to integer register transfer instructions in even numbered queue entries arbitrate for one store port. Floating-point store instructions and floating-point register to integer register transfer instructions in odd numbered queue entries arbitrate for the second store port.

Floating-point store instructions and floating-point register to integer register transfer instructions are queued in both the integer and floating-point queues. These instructions wait in the floating-point queue until their operand register values are available from the floating-point execution unit (Fbox) registers. The instructions subsequently request service from the store arbiter. Upon being issued from the floating-point queue 129, the instructions signal the corresponding entry in the integer queue 128 to request service. Finally, upon being issued from the integer queue 128, the operation is completed.

The integer registers 135, 136 preferably contain storage for the microprocessor's integer registers, results written by instructions that have not yet been retired, and other information as desired. The two register files 135, 136 preferably contain identical values. Each register file preferably includes four read ports and six write ports. The four read ports are used to source operands to each of the two subclusters within a cluster. The six write ports are used to write results generated within the cluster or another cluster and to write results from load instructions.

The floating-point execution queue ("Fbox") 129 contains a floating-point add, divide and square-root calculation unit 142, a floating-point multiply unit 144 and a register file 146. Floating-point add, divide and square root operations are handled by the floating-point add, divide and square root calculation unit 142 while floating-point operations are handled by the multiply unit 144.

The register file 146 preferably provides storage for 72 entries including 31 floating-point registers and 41 values written by instructions that have not yet been retired. The Fbox register file 146 contains six read ports and four write ports (not specifically shown). Four read ports are used to source operands to the add and multiply pipelines, and two read ports are used to source data for store instructions. Two write ports are used to write results generated by the add and multiply pipelines, and two write ports are used to write results from floating-point load instructions.

Referring still to FIG. 2a, the Mbox 150 controls the L1 data cache 160 and ensures architecturally correct behavior for load and store instructions. The Mbox 150 preferably contains a datastream translation buffer ("DTB") 151, a load queue ("LQ") 152, a store queue ("SQ") 153, and a miss address file ("MAF") 154. The DTB 151 preferably comprises a fully associative translation buffer that is used to store data stream address translations and page protection information. Each of the entries in the DTB 151 can map 1, 8, 64, or 512 contiguous 8-KB pages. The allocation scheme preferably is round-robin, although other suitable schemes could also be used. The DTB 151 also supports an 8-bit Address Space Number ("ASN") and contains an Address Space Match ("ASM") bit. The ASN is an optionally implemented register used to reduce the need for invalidation of cached address translations for process-specific addresses when a context switch occurs.

The LQ 152 preferably is a reorder buffer used for load instructions. It contains 32 entries and maintains the state associated with load instructions that have been issued to the Mbox 150, but for which results have not been delivered to the microprocessor and the instructions retired. The Mbox 150 assigns load instruction to LQ slots based on the order in which they were fetched from the instruction cache 110, and then places them into the LQ 152 after they are issued by the integer instruction queue 128. The LQ 152 also helps to ensure correct memory reference behavior for the microprocessor.

The SQ 153 preferably is a reorder buffer and graduation unit for store instructions. It contains 32 entries and maintains the state associated with store instructions that have been issued to the Mbox 150, but for which data has not been written to the data cache 160 and the instruction retired. The Mbox 150 assigns store instructions to SQ slots based on the order in which they were fetched from the instruction cache 110 and places them into the SQ 153 after they are issued by the instruction cache 110. The SQ 153 holds data associated with the store instructions issued from the integer instruction unit 128 until they are retired, at which point the store can be allowed to update the data cache 160. The LQ 152 also helps to ensure correct memory reference behavior for the microprocessor.

The MAF 154 preferably comprises a 16-entry file that holds physical addresses associated with pending instruction cache 110 and data cache 160 fill requests and pending input/output ("I/O") space read transactions.

Microprocessor 100 preferably includes two on-chip primary-level ("L1") instruction and data caches 110 and 160, and single secondary-level, unified instruction/data ("L2") cache 180 (FIG. 2b). The L1 instruction cache 110 preferably is a 64-KB virtual-addressed, two-way set-associative cache. Prediction is used to improve the performance of the two-way set-associative cache without slowing the cache access time. Each instruction cache block preferably contains a plurality (preferably 16) instructions, virtual tag bits, an address space number, an address space match bit, a one-bit PALcode bit to indicate physical addressing, a valid bit, data and tag parity bits, four access-check bits, and predecoded information to assist with instruction processing and fetch control.

The L1 data cache 160 preferably is a 64-KB, two-way set associative, virtually indexed, physically tagged, write-back, read/write allocate cache with 64-byte cache blocks. During each cycle the data cache 160 preferably performs one of the following transactions: two quadword (or shorter) read transactions to arbitrary addresses, two quadword write transactions to the same aligned octaword, two non-overlapping less-than quadword writes to the same aligned quadword, one sequential read and write transaction from and to the same aligned octaword. Preferably, each data cache block contains 64 data bytes and associated quadword ECC bits, physical tag bits, valid, dirty, shared, and modified bits, tag parity bit calculated across the tag, dirty, shared, and modified bits, and one bit to control round-robin set allocation. The data cache 160 is organized to contain two sets, each with 512 rows containing 64-byte blocks per row (i.e., 32 KB of data per set). The microprocessor 100 uses two additional bits of virtual address beyond the bits that specify an 8-KB page in order to specify the data cache row index. A given virtual address might be found in four unique locations in the data cache 160, depending on the virtual-to-physical translation for those two bits. The microprocessor 100 prevents this aliasing by keeping only one of the four possible translated addresses in the cache at any time.

The L2 cache 180 preferably is a 1.75-MB, seven-way set associative write-back mixed instruction and data cache. Preferably, the L2 cache holds physical address data and coherence state bits for each block.

Referring now to FIG. 2b, the L2 instruction and data cache control unit ("Cbox") 170 controls the L2 instruction and data cache 190 and system ports. As shown, the Cbox 170 contains a fill buffer 171, a data cache victim buffer 172, a system victim buffer 173, a cache miss address file ("CMAF") 174, a system victim address file ("SVAF") 175, a data victim address file ("DVAF") 176, a probe queue ("PRBQ") 177, a requester miss-address file ("RMAF") 178, a store to I/O space ("STIO") 179, and an arbitration unit 181.

The fill buffer 171 preferably in the Cbox is used to buffer data that comes from other functional units outside the Cbox. The data and instructions get written into the fill buffer and other logic units in the Cbox process the data and instructions before sending to another functional unit or the L1 cache. The data cache victim buffer ("VDF") 172 preferably stores data flushed from the L1 cache or sent to the System Victim Data Buffer 173. The System Victim Data Buffer ("SVDB") 173 is used to send data flushed from the L2 cache to other microprocessors in the system and to memory. Cbox Miss-Address File ("CMAF") 174 preferably holds addresses of L1 cache misses. CMAF updates and maintains the status of these addresses. The System Victim-Address File ("SVAF") 175 in the Cbox preferably contains the addresses of all SVDB data entries. Data Victim-Address File ("DVAF") 176 preferably contains the addresses of all data cache victim buffer ("VDF") data entries.

The Probe Queue ("PRBQ") 177 preferably comprises a 18-entry queue that holds pending system port cache probe commands and addresses. This queue includes 10 remote request entries, 8 forward entries, and lookup L2 tags and requests from the PRBQ content addressable memory ("CAM") against the RMAF, MAF, and SVAF. Requestor Miss-Address Files ("RMAF") 178 in the Cbox preferably accepts requests and responds with data or instructions from the L2 cache. Data accesses from other functional units in the microprocessor, other microprocessors in the computer system or any other devices that might need data out of the L2 cache are sent to the RMAF for service. The Store Input/Output ("STIO") 179 preferably transfer data from the local microprocessor to I/O cards in the computer system. Finally, arbitration unit 181 in the Cbox preferably arbitrates between load and store accesses to the same memory location of the L2 cache and informs other logic blocks in the Cbox and computer system functional units of the conflict.

Referring still to FIG. 2b, microprocessor 100 preferably includes dual, integrated Rambus memory controllers 190 (Zbox0 and Zbox1). Each Zbox 190 controls 4 or 5 channels of information flow with the main memory 102 (FIG. 1). Each Zbox preferably includes a front-end directory in-flight table ("DIFT") 191, a middle mapper 192, and a back end 193. The front-end DIFT 191 performs a number of functions such as managing the microprocessor's directory-based memory coherency protocol, processing request commands from the Cbox 170 and Rbox 200, sending forward commands to the Rbox, sending response commands to and receiving packets from the Cbox and Rbox, and tracking up to 32 in-flight transactions. The front-end DIFT 191 also sends directory read and write requests to the Zbox and conditionally updates directory information based on request type, Local Probe Response ("LPR") status and directory state.

The middle mapper 192 maps the physical address into Rambus device format by device, bank, row, and column. The middle mapper 192 also maintains an open-page table to track all open pages and to close pages on demand if bank conflicts arise. The mapper 192 also schedules Rambus transactions such as timer-base request queues. The Zbox back end 193 preferably packetizes the address, control, and data into Rambus format and provides the electrical interface to the Rambus devices themselves.

The Rbox 200 provides the interfaces to as many as four other microprocessors and one I/O controller 104 (FIG. 1). The inter-processor interfaces are designated as North ("N"), South ("S"), East ("E"), and West ("W") and provide two-way communication between adjacent microprocessors.

Figure 3:
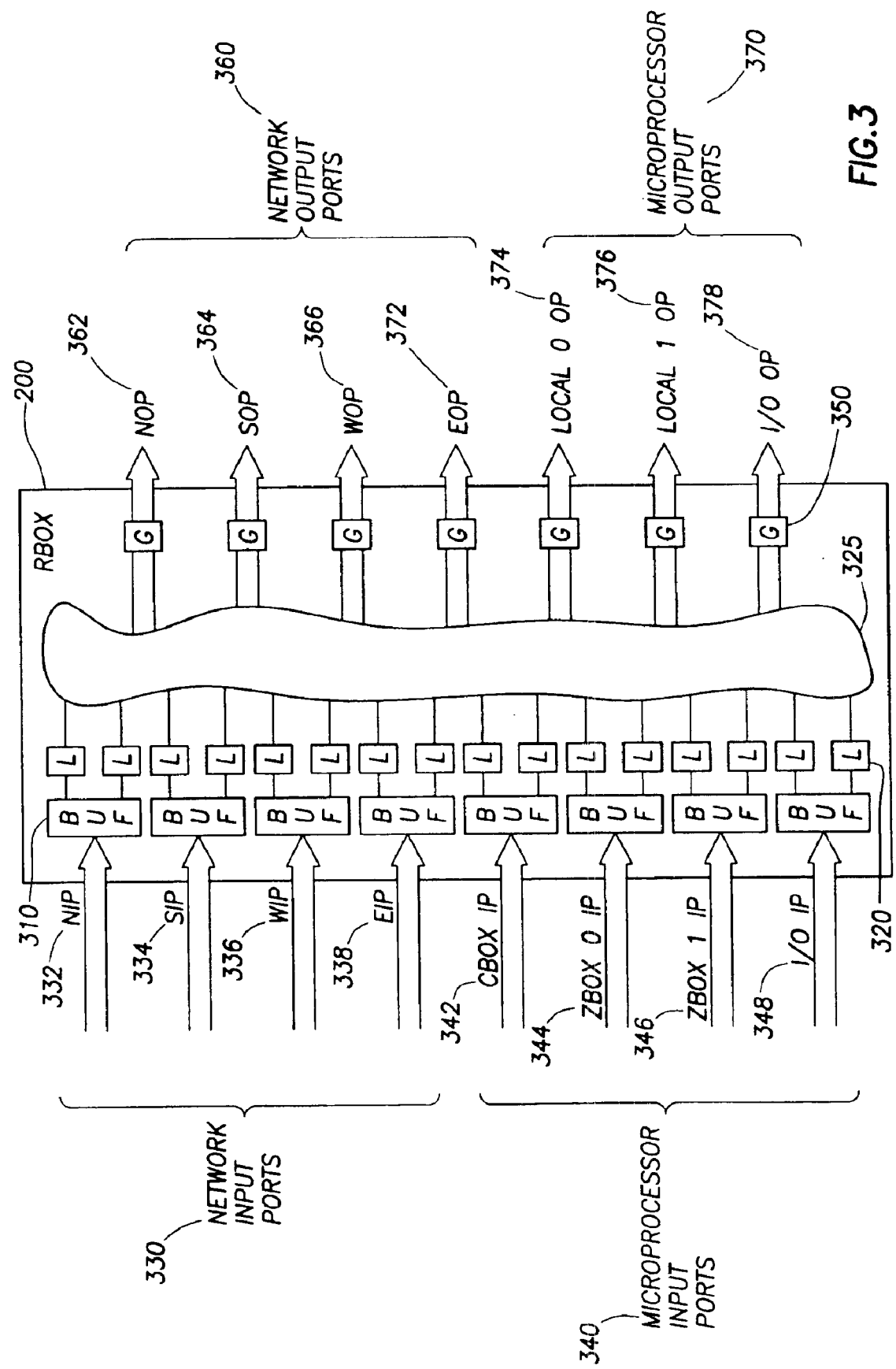
FIG. 3 shows a block diagram of the routing box that routes packets in the microprocessor shown in FIGS. 2a and 2b.

Referring now to FIG. 3, in accordance with the preferred embodiment of the invention, the Rbox 200 includes network input ports 330 and microprocessor input ports 340 for input of message packets into the Rbox. The network input ports 330 preferably comprise a North input port ("NIP") 332, South input port ("SIP") 334, West input port ("WIP") 336, and East input port ("EIP") 338 that permits one-way inbound message passing between microprocessors. The microprocessor input ports 340 preferably include Cbox input port 342, Zbox0 input port 344, Zbox1 input port 346, and I/O input port 348 for message packet transfers from the microprocessor's functional units as well as transfers from an I/O ASIC external to the microprocessor. FIG. 3 further shows a set of local arbiters 320 for each of the input ports. The input ports are connected to the Rbox output ports through a preset hardwired interconnection network 325 that connects the input port to each of the output ports shown in FIG. 3. The output ports preferably comprise network output ports 360 and microprocessor output ports 370. In the preferred embodiment, the network output ports include North output port ("NOP") 362, South output port ("SOP") 364, West output port ("WOP") 366, and East output port ("EOP") 372. The microprocessor output ports preferably consist of Local0 output port 374, Local1 output port 376, and I/O output port 378. In the preferred embodiment, each input port connects to a buffer 310 that in turn connects to a pair of local arbiters 320. Each output port preferably connects to a global arbiter 350.

Network input ports 330 preferably are used to transfer message packets between microprocessors in the DSM system. The microprocessor input ports 340 including Cbox input port 342, Zbox0 input port 344, and Zbox1 input port 346 preferably are used by the Rbox to receive messages from the functional units in the microprocessor that are destined for functional units in other microprocessors or I/O devices connected to the given microprocessor or other microprocessors. The I/O input port 348 is used to transfer messages from I/O devices connected to the microprocessor to the functional units in the same microprocessor or other microprocessors. I/O input port 348 also transfers messages from I/O devices connected to the microprocessor to other I/O devices attached to the same microprocessor or other microprocessors. Each of the input ports connects to a buffer 310. Every buffer connects to two local arbiters 320 that permits two packet transfers to proceed simultaneously in each of two output directions from each input port buffer. Each of the local arbiters nominate a packet destined to an output port. Preferably, local arbitration prioritizes message packets according to the natural dependence priority that exists in the memory coherence protocol described in greater detail below.

Network output ports 360 send packets to other superscalar microprocessors in the distributed shared memory computer system. The Local0 output port 374 and Local1 output port 376 direct message packets either to the Cbox or Zboxes of the microprocessor. I/O output port 378 transmits message packets to I/O devices connected to the superscalar microprocessor. Global arbiters for each output port after receiving nominations from the input port local arbiter prioritizes a message packet based on the particular input port that it originated from as described in greater detail below.

Figure 4:
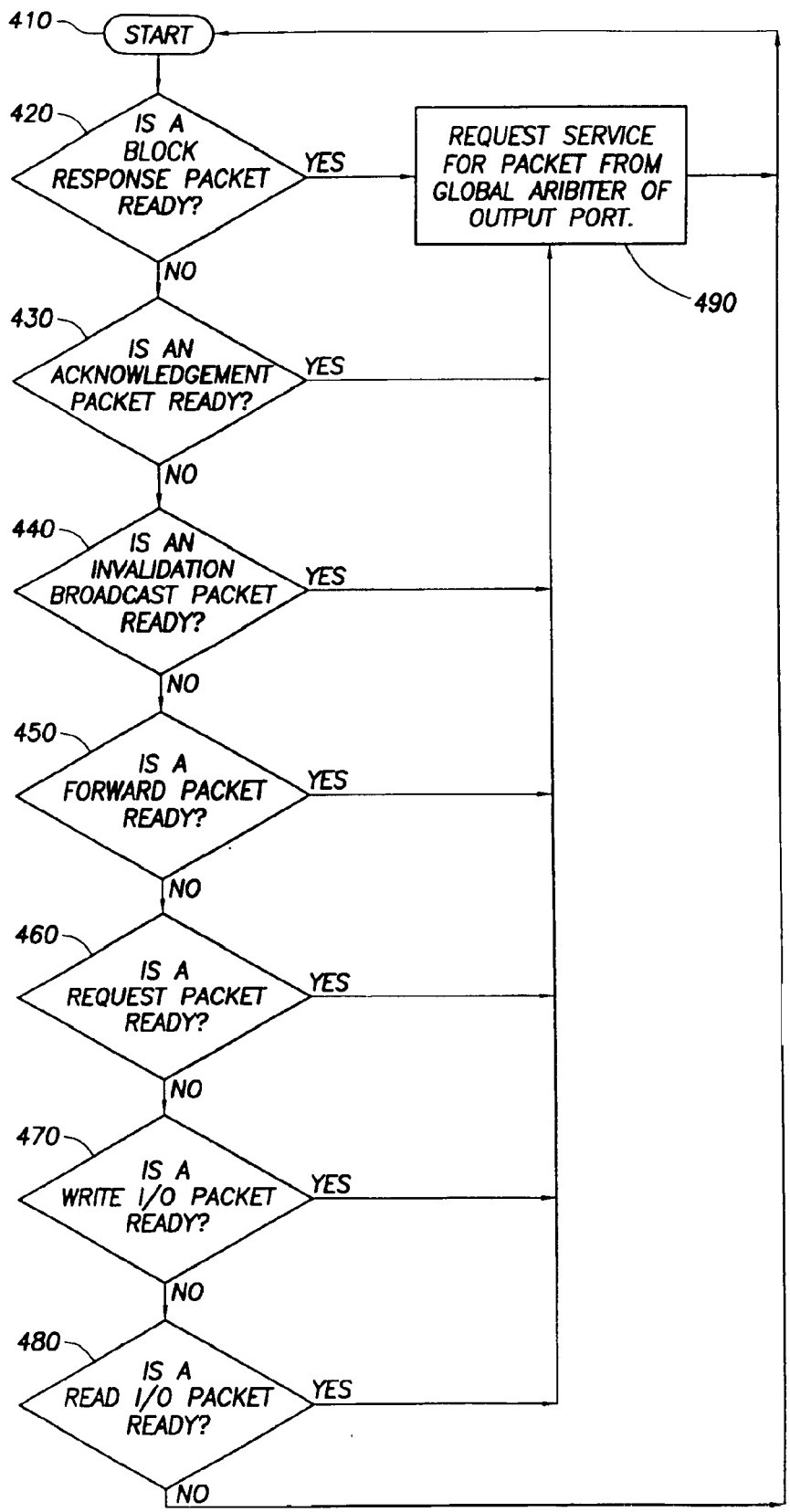
FIG. 4 shows the preferred embodiment of the local arbiter algorithm to prioritize network packet traffic for the input ports shown in FIG. 3.

FIG. 4 describes the preferred embodiment of the algorithm implemented in local arbiter 320 for the input ports of the Rbox in the DSM microprocessor system. The local arbitration algorithm also known as Memory Coherence Dependence Priority rule in the preferred embodiment functions so that packets are prioritized according to the following order: Block Responses, Acknowledgment, Invalidation Broadcast, Forwards, Requests, Write I/Os and Read I/Os (with Block Responses having the highest priority). According to these predefined coherence priorities, a Block Response packet is always generated in response to a Request, giving higher priority to Block Responses. This clears up older packets first before allowing new packets to proceed. In contrast, prior art systems use a Least-Recently- Granted local arbitration policy that gives equal priority to all message packet types.

The preferred method of prioritizing incoming message packets in the local arbiter based on type is shown in FIG. 4. In step 420, the local arbiter determines whether a Block Response packet is ready to depart the Rbox. The local arbiter examines all entries in the buffer 310 to determine the types of message packets that are present. If one or more Block Response packets are ready for departure, the local arbiter requests service for one of these packets from the global arbiter of the appropriate output port, as shown in step 490, and returns to the start, step 410. If no Block Response packets are ready for departure, the local arbiter determines whether one or more Acknowledgment packets is ready (as shown in step 430) for departure to an output port and, if so, requests service for one of these packets from the global arbiter. If no Acknowledgment packets are ready for departure, then the local arbiter determines whether one or more Invalidation Broadcast packets are ready, step 440, and, if so, requests service for one of these packets from the global arbiter, step 490. If no Invalidation Broadcast packets are ready for departure from the input port buffer then the local arbiter determines whether one or more Forward packets is ready for departure, step 450, and, if so, requests service for one of these packets from the global arbiter of the output port, step 490. If no Forward packets are ready for departure from the input buffer then the local arbiter determines whether one or more Request packets are ready, step 460, and, if so, requests service for one of these packets from the global arbiter, step 490. If no Request packets are ready for departure from the input buffer, the local arbiter determines whether one or more Write I/O packets is ready for departure, step 470, and, if so, requests service for one of these packets from the global arbiter of the output port, step 490. Finally, if no Write I/O packets are ready for departure, then the local arbiter determines whether one or more Read I/O packets are ready for departure from the input buffer and, if so, requests service for one of these packets from the global arbiter of the output port, step 490. If no Read I/O packets are ready for departure from the input buffer than the local arbiter simply returns to Start in step 410 and determines whether one or more Block Response packets are present in the input buffer and ready for departure, step 420. Because two local arbiters are present for each input buffer, this allows two packet transfers to proceed simultaneously in each of two output directions for each input port and buffer.

The algorithm shown in FIG. 4 reduces the average overall time needed for a packet to travel through the computer network by using a priority label for each packet type. Using prior art Least-Recently-Granted methods of packet routing and scheduling, network message packet traffic oscillates from congestion to free flow because old packets get blocked behind new packets injected into the network. This builds up congestion in different parts of the network because the congestion is not symmetric. Because of the congestion, average microprocessor link utilization starts to drop. As the congestion clears up, the average microprocessor link utilization rises again. However, at the same time, microprocessors inject more new packets in the network causing the congestion to build up and repeat the oscillation.

The oscillatory behavior of the network appears to be caused predominantly by long resident and long haul Block Response message packets. In the preferred embodiment, Block Responses reside longer than Request or Forward message packets because they are more than six times larger than Request or Forward message packets. The solution described for local arbitration in the preferred embodiment makes Block Response message packets the highest priority packet to be scheduled by the local arbiter thus reducing overall microprocessor link congestion.

Figure 5:
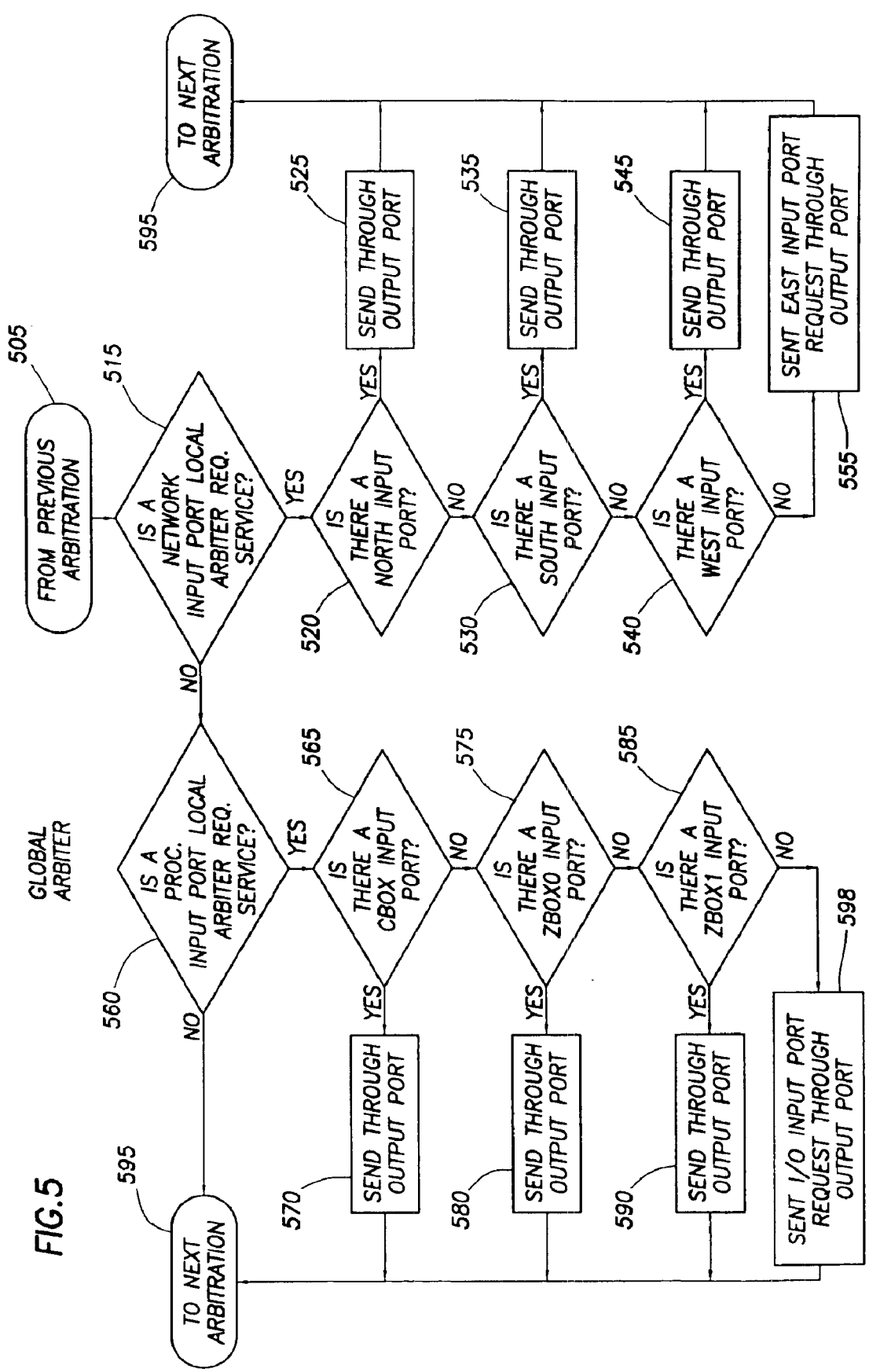
FIG. 5 shows the preferred embodiment of the global arbiter algorithm to prioritize network packet traffic at the output ports shown in FIG. 3.

Turning now to FIG. 5, the global arbiters 350 shown in FIG. 3 for each output port in the Rbox receive message packet nominations from the local arbiters of each input port. The message packets can loosely be labeled into two generic classes. The first class is message packets arriving from a network input port such as the North, South, East or West input ports that have originated from another microprocessor in the multiprocessing computer system. The second generic class is packets arriving from local ports such as Cbox, Zbox0, Zbox1 or an I/O port, that originate from functional units within the microprocessor itself or attached I/O devices. For global arbitration, packets arriving from a network input port receive higher priority over packets arriving from microprocessor input ports. This rule is in contrast with the default global arbitration rule that arbitrates for input ports in a Least-Recently-Granted fashion. Prioritizing the packets from network input ports instead of choosing input ports in a Least-Recently-Granted fashion clears up older packets existing in the network before new packets are injected from the microprocessors. This allows faster removal of congestion and consequent reduction in network oscillations.

In the preferred embodiment, each global arbiter maintains a priority list that captures the priority order of the input ports from which the global arbiter chooses its packet. Each global arbiter is hardwired to a set of input ports and thus in its priority list must determine whether a particular packet is from a network input port and give this packet higher priority over packets arriving from microprocessor input ports. A global arbiter will choose a packet from the North input port, if the North input port has a packet waiting and ready and has the highest priority over all other network input ports. After scheduling a packet's departure from a network input port, the global arbiter minimizes the priority of that network input port in its priority list. This allows it to implement a modified Least-Recently-Granted policy within the network input ports and the microprocessor input ports. To implement this algorithm, the priority list must be loaded with the correct priority order, that is network input ports have higher priority over microprocessor input ports. Then after scheduling the packet's departure, the global arbiter must minimize the priority of that input port within its port category. Thus, in the earlier example, the global arbiter would make the North input port have the lowest priority among the network input ports, but the North input port's priority would still be higher than the priority of the microprocessor input ports. In other words, the global arbiter would give higher priority to the network input ports over the microprocessor input ports, but it would use Least-Recently-Granted policy within the four network input ports and four microprocessor input ports.

FIG. 5 shows the global arbiter algorithm for a possible state of the priority list. Because of the lack of output buffers and for other reasons, transmission of a message packet through the output port into another microprocessor link may require a much larger amount of time as compared to the time to transfer the same message packet within the microprocessor. Because no output buffer is present, a message packet accepted by the output port must be transmitted through the output port without any buffering. After completion of a prior arbitration 505, the global arbiter determines whether a network input port local arbiter is requesting service (step 515). If so, the global arbiter in step 520 determines whether the North input port has nominated a packet and if so, in step 525 sends the message packet from the North input port through the output port. The global arbiter than goes to the next arbitration 595. If the message packet is not from the North input port, the global arbiter determines if any message packet has been nominated by the South input port (step 530) and, if so, transmits the message packet through the output port (step 535). If no message packets have been nominated by the South input port, the global arbiter determines whether any message packets are present in the West input port (step 540) and, if so, sends a message packet through the output port (step 545). Finally, if no message packets are present in the West input port, because step 515 indicated that one network input port local arbiter was requesting service and because the only port remaining is the East input port, the global arbiter transmits the message packet nominated by the East input port through the output port (step 555). The global arbiter then goes to the next arbitration (step 595). In step 515, if a network input port local arbiter is not requesting service, then the global arbiter determines whether a microprocessor input port local arbiter is requesting service (step 560). If the microprocessor input port local arbiter is not requesting service then the global arbiter goes to the next arbitration (step 595). If a microprocessor input port local arbiter is requesting service, the global arbiter determines whether the Cbox input port has nominated a packet and, if so, transmits the message packet from the Cbox input port (step 565) through the output port (step 570) and goes to the next arbitration (step 595). If a Cbox input port is not requesting service then the global arbiter determines whether the Zbox0 input port (step 575) has nominated a message packet and, if so, sends the message packet through the output port (step 580) of the Rbox. If a Zbox0 input port is not requesting service from the global arbiter of the output port then the global arbiter determines whether a Zbox1 input port (step 585) is requesting service to transmit a message packet through the output port and, if so, sends the message packet through the output port (step 590). If a Zbox1 is not requesting service from the output port, because step 560 indicated that one microprocessor input port local arbiter was requesting service and because the only port remaining is the I/O input port, the global arbiter transmits the message packet nominated by the I/O input port through the output port (step 598). The global arbiter then goes to the next arbitration (step 595). The algorithm of FIG. 5 shows that a global arbiter gives priority to packets from network input ports over packets from microprocessor input ports and performs Least-Recently-Granted scheduling between network input ports (steps 515–555) and Least-Recently-Granted scheduling between microprocessor input ports (steps 560–598) to transmit packets.

The local and global arbiters shown in FIG. 3 and described in FIGS. 4 and 5 prior to transmitting a message packet must perform a combination of several readiness tests to determine whether a packet can be scheduled from an input port's buffer to an output port. These tests are:

Check if the network can accept the message packet. This is needed because the network runs at least 1.5 times slower than the preferred embodiment of the superscalar microprocessor clock.

Check whether the same message packet is selected by both the local arbiters for an input port. Because the local arbiters for each input port operate independently (except for this test), they can select the same message packet from the same input port.

Check if the input port buffer has a valid message packet type.

Check if the output port is busy.

Check if the destination can accept this message packet (i.e., has a free buffer for this class of message packets).

Check if a packet waiting at a input port buffer is starved. If so, the antistarvation mechanism described below is triggered.

Preferably, the local and global arbiter algorithms shown in FIGS. 4 and 5 are implemented in hardware and execute in parallel for each of the input and output ports. Hardware execution results in high performance for the microprocessor of the preferred embodiment.

The local and global arbiter algorithms shown in FIGS. 4 and 5 may result in starvation of a message packet that is denied transmission access through the input port or an output port because of its low priority. This type of starvation can occur because the global arbiters always give requests from network input ports priority over requests from microprocessor input ports. Thus, a steady stream of message packets from network input ports could indefinitely block a packet waiting in a message input port. A similar starvation scenario exists for local arbiters because they always give priority to certain packet types over other packet types. Thus, a steady supply of message packets of one packet type could indefinitely block a packet of a lower-priority type.

Another type of starvation arises because a message packet is never ready for dispatch and no request is ever made to a local arbiter or global arbiter on its behalf. This starvation scenario can arise because the local and global arbiter's decisions are independent of each other. FIG. 6 shows an example of the starvation scenario. Two packet streams arrive at the East and West input ports. The packet stream from the East input port is destined toward the North output port, while the packet stream at the West input port is destined toward the South output port. However, the West input port also has a starved packet, 625, destined for the North output port stuck at the beginning of its input queue. Initially, both the East and West local arbiters nominate packets 1e and 1w, respectively, for the North output port, 605 and 630. Assuming that the global arbiter at the North output port selects packet 1e, as indicated by the assertion of East IP buffer busy signal 610 and 612, in the next cycle, the local arbiter at the West input port would notice that the North output port is busy. Consequently, it will nominate packet 2w for departure through the South output port 635. The South output port global arbiter will select packet 2w as indicated by the assertion of West IP buffer busy signal 640. Unfortunately, when the North output port becomes free because packet 1e has departed, the West input port is still busy delivering packet 2w to the South output port, 642. Consequently, the North global arbiter selects the packet 2e, as indicated by the assertion of the East IP buffer busy signal 620, nominated by the East input port, 615. When the West input port finally becomes free of packet 2w, it again finds the North output port busy, 622. Hence, it selects the subsequent packet, i.e., packet 3w, 645, for departure through the South output port, as indicated by the assertion of the West IP buffer busy signal 650 and 652. If packet streams continue to arrive in this fashion, packet 1w will be stuck forever in West input port's queue.

To solve the starvation problem, the Rbox in each microprocessor maintains for each type of packet a current color for the incoming packet. All incoming packets are assigned the current color. The current color flips between 0 and 1. Unless one or more packets of a given packet type waiting in an input port were assigned the color to which the current color is about to flip to, the current color for a given packet type flips periodically. These two per type colors allow the Rbox to distinguish between potentially starved and new packets. Thus, packets with non-current colors are older packets that can get starved.

To determine if older packets are starved, each type of packet also has a starvation timer that counts down from a maximum value to zero. Whenever a starvation timer expires (and the Rbox enters the starvation mode), it indicates that packets have resided for a somewhat long time without being dispatched. At this point, the buffers beyond the Rbox that will receive the packet when the packet is dispatched from an output port are reserved for starved message packets of the packet type. Reserving buffers for starved packets guarantees that the starved packets will get dispatched after a finite amount of time.

The above solution is deadlock free, but is not sufficient to prevent starvation because the pathway out of the input port where the packet is waiting and the pathway out of the output port through which it is to be dispatched may never be free at the same time. Consequently, a second mechanism is needed to dispatch packets whenever the target buffer of a starved packet is free. The microprocessor of the preferred embodiment uses an additional timer per type called a drain timer, which gets activated whenever a starvation timer has expired and the target buffer of a starved packet of the corresponding class is free. When any drain timer of any type expires (and the Rbox enters the drain mode), the Rbox dispatches only packets with non-current color. The Rbox is guaranteed to make forward progress because in the drain mode, it must be able to dispatch at least one packet. When there are no more starved packets with free target buffers, the Rbox leaves drain mode, but remains in starvation mode as long as starved packets remain, only to return to drain mode if any of their target buffers become free.

Obviously, the frequency with which the starvation and drain timers expire can have a profound affect on the performance of Rbox. If these timers expire frequently in the absence of starvation, then they will continuously reserve their destination output ports and destination input buffers. This will prevent other packets from making progress particularly in the drain mode until the starvation has cleared.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A distributed multiprocessing computer system, comprising:
   a plurality of microprocessor units coupled to each other, wherein each microprocessor unit comprises;
   a router to route message packets between said microprocessor units;
   a plurality of network input ports and network output ports connecting said plurality of microprocessor units to form a computer network, wherein each of said network input ports couples to one or more associated local arbiters in the router, each of said local arbiters operable to select a message packet among message packets waiting at the network input port,
   wherein the router giver higher priority to message packets associated with the network ports than to message packets associated with other microprocessor ports and wherein the router arbitrates between the network ports using a predetermined prioritization and a least-recently-granted prioritization.

2. The distributed multiprocessing computer system of claim 1 wherein the router arbitrates between the other microprocessor ports using a predetermined prioritization and a least-recently-granted prioritization.

3. The distributed multiprocessing computer system of claim 1 wherein said router includes a plurality of timers that indicate when a message packet must be immediately dispatched.

4. The distributed multiprocessing computer system of claim 3 wherein the plurality of timers comprise starvation timers and drain timers.

5. The distributed multiprocessing computer system of claim 1 wherein said microprocessor unit further includes a plurality of microprocessor input ports and microprocessor output ports that allow the exchange of message packets between hardware functional units in the message unit and between microprocessor units.

6. The distributed multiprocessing computer system of claim 5 wherein each of said microprocessor input ports couples to local arbiters in the router, each of said local arbiters able to select a message packet among message packets waiting at the microprocessor input port.

7. The distributed multiprocessing computer system of claim 6 wherein each of said network output ports and microprocessor output ports couples to a global arbiter in the router that selects a message packet from message packets nominated by the local arbiters of said network input ports and microprocessor input ports.

8. The distributed multiprocessing computer system of claim 7 wherein the global arbiter selects and outputs the message packet from message packets based on an input port hierarchy.

9. The computer system of claim 7 wherein said network output port global arbiter or microprocessor output port global arbiter selects said message packet Least-Recently-Granted from the network input ports, then Least-Recently-Granted from the microprocessor input ports if said network output port or microprocessor output port is idle.

10. The computer system of claim 7 wherein if a first message packet type is ready to be dispatched from the network input port or microprocessor input port, the local arbiter requests service for the first message packet type from the global arbiter of the destination network output port or microprocessor output port.

11. The computer system of claim 10 wherein if a second message packet type is ready to be dispatched from the network input port or microprocessor input port, the local arbiter requests service for the second message packet type from the global arbiter of the destination network output port or microprocessor output port.

12. The computer system of claim 11 wherein if a third message packet type is ready to be dispatched from the network input port or microprocessor input port, the local arbiter requests service for the third message packet type from the global arbiter of the destination network output port or microprocessor output port.

13. The computer system of claim 12 wherein if a fourth message packet type is ready to be dispatched from the network input port or microprocessor input port, the local arbiter requests service for the fourth message packet type from the global arbiter of the destination network output port or message output port.

14. The computer system of claim 13 wherein if a fifth message packet type is ready to be dispatched from the network input port or microprocessor input port, the local arbiter requests service for the fifth message packet type from the global arbiter of the destination network output port or microprocessor output port.

15. The computer system of claim 14 wherein if a sixth message packet type is ready to be dispatched from the network input port or microprocessor input port, the local arbiter requests service for the sixth message packet type from the global arbiter of the destination network output port or microprocessor output port.

16. The computer system of claim 15 wherein if a seventh message packet type is ready to be dispatched from the network input port or microprocessor input port, the local arbiter requests service for the seventh message packet type from the global arbiter of the destination network output port or microprocessor output port.

17. A method of routing messages in a distributed multiprocessing computer system, comprising:
  selecting a message packet at each of a plurality of microprocessor router input ports from message packets buffered at each input port based on the type of message packet; and
  transmitting from an idle microprocessor router output port a message packet chosen from the plurality of selected microprocessor router input port message packets, said message packet chosen for transmission by the output port based on the microprocessor router input port priority,
  wherein said selecting and said transmitting reduces routing latency of the distributed multiprocessing computer system by assigning message packets already in transit higher priority than new message packets and by implementing a combination of type-based and least-recently-granted routing algorithms for both message packets already in transit and new message packets.

18. The method of claim 17 wherein said transmitting a message packet includes the step of prioritizing said message packet Least-Recently-Granted from network input ports, then Least-Recently-Granted from microprocessor input ports, wherein said network input ports and said microprocessor input ports are microprocessor router input ports.

19. The method of claim 17 wherein said selecting a message packet includes the step of:
  determining if a Block Response packet is ready to be dispatched from the input port buffer; and
  if the Block Response packet is ready, selecting the Block Response packet.

20. The method of claim 19 wherein said selecting a message packet includes the step of:
  if no Block Response packet is ready, determining if a Acknowledgment packet is ready to be dispatched from the input port buffer; and
  if the Acknowledgment packet is ready, selecting the Acknowledgment packet.

21. The method of claim 20 wherein said selecting a message packet includes the step of:
  if no Acknowledgment packet is ready, determining if an Invalidation Broadcast packet is ready to be dispatched from the Input port buffer; and
  if the Invalidation Broadcast packet is ready, selecting the Invalidation Broadcast packet.

22. The method of claim 21 wherein said selecting a message packet includes the step of:
  if no Invalidation Broadcast packet is ready, determining if a Forward packet is ready to be dispatched from the input port buffer; and
  if the Forward packet is ready, selecting the Forward packet.

23. The method of claim 22 wherein said selecting a message packet includes the step of:
  if no Forward packet is ready, determining if a Request packet is ready to be dispatched from the input port buffer; and
  if the Request packet is ready, selecting the Request packet.

24. The method of claim 23 wherein said selecting a message packet includes the step of:
  if no Request packet is ready, determining if a Write I/O packet is ready to be dispatched from the input port buffer; and
  if the Write I/O packet is ready, selecting the Write I/O packet.

25. The method of claim 24 wherein said selecting a message packet includes the step of:
  if no Write I/O packet is ready, determining if a Read I/O packet type is ready to be dispatched from the input port buffer; and
  if the Read I/O packet is ready, selecting the Read I/O packet.

26. A distributed multiprocessing computer system, comprising:
  means for selecting a message packet at each of a plurality of microprocessor router input ports from message packets buffered at each input port based on the type of message packet wherein message packets that pass through at least three microprocessors to reach a destination are given highest priority; and
  means for transmitting from an idle microprocessor router output port a message packet chosen from the plurality of selected microprocessor router input port message packets, said message packet chosen for transmission by the output port based on the message router input port priority,
  wherein operation of said means for selecting and said means for transmitting reduces routing latency of the distributed multiprocessing computer system.

27. The distributed multiprocessing computer system of claim 26, wherein the message packets are selected in an order based on the type of message packet and wherein the order from highest priority to lowest priority consists of Block Response packet type. Acknowledgement packet type, Invalidation Broadcast packet type, Forward packet type, Request packet type, Write I/O packet type, and Read I/O packet type.

28. A distributed multiprocessing computer system, with a plurality of microprocessors, which comprise:
  a router to route message packets between said microprocessors, and wherein said router prioritizes message packets based upon type of message packet, age of the message packet, and source of the message packet;
  a plurality of network input ports and network output ports connecting said plurality of microprocessors to form a computer network, wherein each of said network input ports couples to one or more associated local arbiters in the router, each of said local arbiters operable to select a message packet among message packets waiting at the network input port;
  a plurality of microprocessor input ports and microprocessor output ports that allow the exchange of message packets between hardware functional units in the microprocessor and between microprocessors, wherein each network input port and each microprocessor input port is assigned a different priority and wherein all network input ports have higher priority than the microprocessor input ports; and a disk drive coupled to each of said plurality of microprocessors.

29. The distributed multiprocessing computer system of claim 28 wherein said router prioritizes message packets based on the source of the message packet comprises the router giving message packets associated with network input ports higher priority than message packets associated with microprocessor input ports.

30. The distributed multiprocessing computer system of claim 29 wherein said router prioritizes message packets based on the source of the message packet further comprises the router giving message packets associated with I/O ports lowest priority and wherein the I/O ports are associated the disk drive coupled to each of said plurality of microprocessors.

31. A system, comprising:

a plurality of microprocessors coupled to each other and configured to prioritize message packets transferred between two or more of the microprocessors and message packets transferred between two or more hardware units within each of the microprocessors, wherein each of the microprocessors comprises, network ports configured to receive message packets from other microprocessors and output message packets to other microprocessors;

microprocessor ports configured to receive message packets from the hardware units and output message packets to the hardware units; and a router coupled to the network ports and the microprocessor ports, wherein the router assigns the network ports higher priority than the microprocessor ports and prioritizes message packets associated with each of the network ports and each of the microprocessor ports according to a predetermined prioritization and according to a least-recently-granted prioritization.

32. The system of claim 31 wherein the predetermined prioritization is based on message packet types.

33. The system of claim 32 wherein the message packet types are selected from a group of packets types consisting of: block response packets, acknowledgement packets, invalidation broadcast packets, forward packets, request packets, write I/O packets and read I/O packets.

34. The system of claim 33 wherein block response packets have highest priority.

35. The system of claim 32 wherein the predetermined prioritization is based on a source of the message packet.

36. The system of claim 35 wherein the source of the message packet is selected from a group of sources consisting of: a first network port, a second network port, a third network port, a fourth network port, a cache control unit, a memory controller and an input/output port.

37. The system of claim 36 wherein the first network port, the second network port, the third network port, the fourth network port, the cache control unit, the memory controller and the input/output port are each assigned a different predetermined priority and wherein the first, second, third and fourth network ports are assigned a higher priority than the cache control unit, the memory controller and the input/output port.

38. The system of claim 37 wherein the cache control unit and the memory controller are assigned a higher priority than the input/output port.

39. The system of claim 31 wherein the router further comprises:

local arbiters;

global arbiters; and input buffers, wherein the local and global arbiters implement algorithms to carry out the least-recently-granted prioritization.

40. The system of claim 39 wherein the algorithms detect when a message packet is denied transmission for more than a threshold amount of time due to at least one of a type of the message packet and a source of the message packet.

41. The system of claim 39 wherein the algorithms detect when a message packet is denied transmission for more than a threshold amount of time due to the local arbiters and the global arbiters operating independently of each other.

42. The system of claim 39 wherein the local and global arbiters are configured to perform tests before transmitting a particular message packet, wherein the tests are selected from a group of tests consisting of: checking if a network can accept the particular message packet, checking whether the particular message packet is selected by more than one local arbiter, checking a message packet type, checking if an output port of the router is busy, checking if a destination can accept the particular message packet and checking if a starved message packet is waiting at the input buffers.

43. The system of claim 39 wherein the router is configured to periodically change the value of a bit associated with a message packet to identify the message packet as non-current.

44. The system of claim 43 wherein the router further comprises a starvation timer that counts down from a maximum value to zero after a message packet is identified as non-current.

45. The system of claim 44 wherein the router further comprises buffers reserved to receive message packets that cause the starvation timer to reach zero.

46. The system of claim 45 wherein the router further comprises a drain timer that is activated when the starvation timer reaches zero and when a target buffer of a message packet associated with an expired starvation timer is available.

47. The system of claim 46 wherein, when the drain timer expires, the router dispatches only message packets that are non-current until there are no message packets associated with an expired starvation timer.

* * * * *

UNITED STATES PATENT AND TRADEMARK OFFICE
CERTIFICATE OF CORRECTION

PATENT NO. : 6,961,781 B1  
APPLICATION NO. : 09/652322  
DATED : November 1, 2005  
INVENTOR(S) : Shubhendu S. Mukherjee et al.

It is certified that error appears in the above-identified patent and that said Letters Patent is hereby corrected as shown below:

On the Title page, in Item (57), under "Abstract", in column 2, line 15, after "between" delete "the".

In column 3, line 27, delete "than" and insert -- that --, therefor.

In column 6, line 34, delete "than" and insert -- that --, therefor.

In column 7, line 13, delete "by" and insert -- be --, therefor.

In column 12, line 56, delete "microprocessor" and insert -- multiprocessor --, therefor.

In column 15, line 4, delete "than" and insert -- then --, therefor.

In column 16, line 20, delete "message" and insert -- microprocessor --, therefor.

In column 17, line 64, in Claim 1, delete "giver" and insert -- gives --, therefor.

In column 18, line 18, in Claim 5, delete "message" and insert -- microprocessor --, therefor.

In column 18, line 64, in Claim 13, delete "message" and insert -- microprocessor --, therefor.

In column 19, line 60, in Claim 21, delete "Input" and insert -- input --, therefor.

In column 20, line 37, in Claim 26, delete "message" and insert -- microprocessor --, therefor.

In column 20, line 46, in Claim 27, delete "type." and insert -- type, --, therefor.

Signed and Sealed this  
Fourth Day of October, 2011

David J. Kappos  
*Director of the United States Patent and Trademark Office*